United States Patent [19]

Renger

[11] Patent Number: 4,814,685

[45] Date of Patent: Mar. 21, 1989

[54] INDUCTIVE POWER CONVERTER FOR USE WITH VARIABLE INPUT AND OUTPUT VOLTAGES

[75] Inventor: Herman L. Renger, Calabasas, Calif.

[73] Assignee: Pacesetter Infusion, Ltd., Sylmar, Calif.

[21] Appl. No.: 128,977

[22] Filed: Dec. 4, 1987

[51] Int. Cl.$^4$ .................................................. G05F 1/62
[52] U.S. Cl. ..................................... 323/224; 323/266; 323/285
[58] Field of Search ............... 323/222, 224, 266, 267, 323/282, 283, 284, 285, 299

[56] References Cited

U.S. PATENT DOCUMENTS 4,618,812 10/1986 Kawakami ........................... 323/224
4,729,088 3/1988 Wong ................................... 323/224

Primary Examiner—Peter S. Wong
Attorney, Agent, or Firm—Leslie S. Miller

[57] ABSTRACT

A power converter for use in converting a variable DC input voltage into a variable DC output voltage is disclosed which uses control circuitry on both the input and the output to optimize converter performance. By charging the inductor up nearly to the saturation point, but completely avoiding saturation of the inductor, power capability at the input end is maximized. By discharging the inductor completely without either losing power capability by continuing to attempt to discharge the inductor after the charge is depleted or by failing to nearly discharge the inductor thereby presenting the possibility of saturation to the boosting of current through the inductor during the next charge cycle.

21 Claims, 1 Drawing Sheet

INDUCTIVE POWER CONVERTER FOR USE WITH VARIABLE INPUT AND OUTPUT VOLTAGES

BACKGROUND OF THE INVENTION

Field of the Invention

The present invention relates generally to a DC power converter for producing an output voltage different from the input voltage to the converter, and more particularly to an inductive DC power converter which optimizes the power conversion from a variable DC voltage input to a variable DC voltage output while both providing maximum efficiency and power from the inductor during conversion and avoiding saturation of the inductor during conversion.

DC power converters have the basic requirement of supplying a particular output DC voltage level from a typically constant input DC voltage level. Unlike the less sophisticated AC transformer, which is relatively basic, the DC power converter must operate using a relatively constant level of input voltage. Two techniques which have been developed to convert a DC input voltage to a desired DC output voltage use reactive circuit elements, typically capacitors and inductors, as energy storage media. Such devices operate by periodically switching the reactive element into alternating connection with the DC input voltage to charge the reactive element, and with the DC output circuit to discharge the reactive element.

Due to the nature of capacitors and inductors, inductors have found greater favor for use in DC power converters than have capacitors. This is largely because inductors capable of providing a specific capacity are cheaper, smaller, and easier to work with than are capacitors having the same capacity (with the specific exception of device having only very small capacities). It has been recognized for some time that inductors may advantageously be used as energy storage media, which may be switched between an input voltage and an output circuit to convert DC power.

Early examples of inductive power converters may be found primarily in welding circuits, such as for example in U.S. Pat. No. 2,276,796, to Rogers, and in U.S. Pat. No. 2,276,851, to Livingston. The Rogers device uses a shunt resistor and a relay to switch the inductor between the input and the output when a sufficient current is detected to exist in the inductor. The Livingston device triggers on voltage rather than on current, and utilizes at the monitored voltage a waveform derived from an unfiltered, full wave rectified sine wave. These devices are used to generate a welding current, and are not very precise due to the nature of a welder type device.

More sophisticated devices using an inductive coil have been developed, such as the simple solenoid, which uses the magnetic field generated by an inductor to drive a plunger to perform mechanical work. Examples of such devices are found in U.S. Pat. No. 4,173,030, to Rabe, and in U.S. Pat. No. 4,293,888, to McCarty. The Rabe device, which uses the solenoid to actuate a fuel injector, times the application of voltage to the solenoid coil depending on the level of voltage, with the desired effect being to consistently achieve operation of the fuel injector. The McCarty device, which is a print hammer drive circuit, measures for a minimum current required to consistently actuate the print hammer, and applies that current for a brief time period. Neither of these device convert DC power to DC power, both converting electrical energy to mechanical energy.

Recent examples of DC to DC power converters for more sophisticated applications are found in U.S. Pat. No. 3,191,074, to Carruthers et al., and in U.S. Pat. No. 4,511,829, to Wisniewski. The Carruthers et al. device is used to store particularly high levels of energy which may be inductively switched, and it, like the Rogers and McCarty devices, measures current flowing through the inductor to control the operation of the device. The Wisniewski device is more sophisticated, and it uses timed charging with the discharge time being based on the level of current in the output circuit.

It is particularly notable that except for the Rabe device, none of the devices discussed above are designed to be operable with a variable DC input voltage. The Rabe device may also be dismissed since it is not a power converter, but rather a solenoid. It is therefore an object of the present invention to design a DC to DC inductive power converter which is capable of operating with a variable DC input voltage, preferably over a relatively wide range of DC input voltages. This will allow the power converter of the present invention to operate successfully with a broad range of input voltages.

It is also desirable to design a DC to DC inductive power converter which will be capable of supplying an output voltage which may vary widely. Previously known devices may have operated at variable voltage DC outputs, but they were not designed to do so efficiently over a wide range of output voltages. The present invention shall be capable of supplying a wide range of output voltages efficiently, and shall in an alternate embodiment also be capable of simultaneously supplying power at more than one voltage level.

It is also an objective of the present invention to operate in as efficient a manner as is possible. Efficiency of a DC to DC converter has two components, namely input efficiency and output efficiency. Input efficiency is maximized by charging the inductor to a point near saturation, but slightly short of saturation. Saturating the inductor is bad per se from an efficiency standpoint, and it may also saturate solid state electronic switches used to switch the inductor between the input and output circuits. Shortening the charging time significantly beyond the extent necessary to avoid saturation destroys power capability of the device. It is a further object of the present invention to enable charging of the inductor to a point near, but short of, saturation at any or all of the DC input voltages at which the device may be operated.

Output efficiency is dependent on just barely discharging the inductor, but not continuing to attempt to discharge it once it is completely discharged. The failure to just discharge the inductor will result in boosting currents during the next charge cycle, since the current remaining will be added to by additional current during the next charge cycle. This will likely result in saturation, and all of the drawbacks and inefficiencies discussed above. Lengthening the discharge time beyond the time necessary to discharge the inductor damages power capability of the system. It is therefore an object of the present invention to enable discharging of the inductor completely, without wasting any additional time and adversely affecting efficiency.

By simultaneously maximizing efficiency on both the input side of the inductor and the output side of the inductor, overall efficiency and power capability of the device will be maximized. It is a further objective of the device that the beneficial effects previously described be achieved at a reasonable economic cost, and that the device of the present invention not be unduly complex. By achieving these objectives, the system of the present invention will be able to convert a variable DC input voltage into a variable DC output voltage, while maximizing overall power capability of the system unlike any previously known device. It is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, and inductive power converter which converts a variable DC input voltage into a variable DC output voltage. Like previously known inductive power converters, the input voltage is supplied to charge the inductor, and the inductor is then connected to drive an output circuit. However, the present invention utilizes a voltage comparator on the voltage input to analyze which of a plurality or voltage levels the input voltage falls into. Dependent om which voltage level the input voltage is determined to fall into, a timing circuit charges the inductor for the maximum period of time possible while avoiding saturation.

Similarly, a voltage comparator is used on the output of the device to determine which of a plurality or voltage levels the output voltage falls into. Dependent on which voltage level the output voltage is determined to fall into, a timing circuit discharges the inductor for the minimum period of time necessary to completely discharge the inductor. It will at once be appreciated that this system will maximize efficiency and power capability of operation of the device, both on the input side and on the output side. In the preferred embodiment, a simplified control circuit is used which makes the system even more economical to construct.

In an additional alternate embodiment, two variable output voltages may be provided by using three inductors instead of one inductor. A first inductor is charged as described above, and through a diode independently drives each of two additional inductors. Each of the two additional inductors has a voltage comparator which is used on the output of that additional inductor to determine which of a plurality of voltage levels the output on that additional inductor voltage falls into. Dependent on which voltage level the output voltage on that inductor is determined to fall into, a timing circuit discharges that additional inductor for the minimum period of time necessary to completely discharge that additional inductor.

It may therefore be seen that the present invention teaches a DC to DC inductive power converter which is capable of efficiently operating over a relatively wide range of DC input voltages. The DC to DC inductive power converter of the present invention is also capable of efficiently supplying an output voltage which may vary widely. The present invention in an alternate embodiment is also capable of simultaneously and efficiently supplying power at more than one voltage level.

The system of the present invention maximizes the efficiency of the power conversion process. It enables charging of the inductor to a point near, but short of, saturation at any or all of the DC input voltages at which the device may be operated. It also enables discharging of the inductor completely, without wasting any additional time and adversely affecting power capability. By simultaneously maximizing efficiency on both the input side of the inductor and on the output side of the inductor, overall efficiency and power capability of the device will be maximized.

The beneficial effects previously described are achieved at a reasonable economic cost, and the device of the present invention is not unduly complex. By achieving these objectives, the system of the present invention is able to convert a variable DC input voltage into a variable DC output voltage, while maximizing overall power capability of the system unlike any previously known device. In the alternate embodiment two different DC output voltages may be provided without sacrificing any of the advantages realized by the invention. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
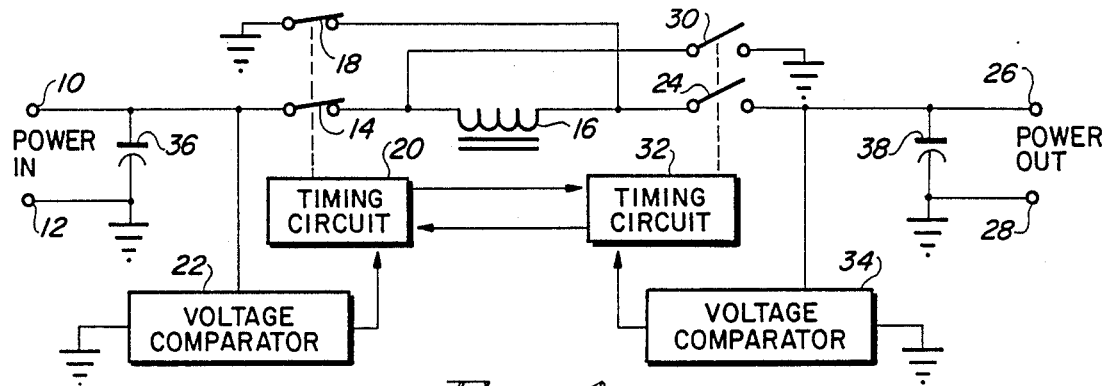
FIG. 1 is a somewhat functional schematic diagram of a first embodiment of the present invention by which a variable DC input voltage may be converted into a variable DC output voltage.

A first embodiment of the present invention is illustrated in FIG. 1. A DC input voltage which may be at any of a number of different levels is supplied to the circuit through a positive input terminal 10 and a negative input terminal 12, the latter of which is grounded. The positive input terminal 10 is connected to one side of a first switch 14, the other side of which first switch 14 is connected to one side of an inductor 16. The other side of the inductor 16 is connected to one side of a second switch 18, the other side of which inductor 16 is connected to ground.

The first switch 14 and the second switch 18 are preferably either mechanically or electrically required to operate together, so that when the first switch 14 is closed the second switch 18 is also closed, and so that when the first switch 14 is open the second switch 18 is also open. The first switch 14 and the second switch 18 are operated by a input timing circuit 20, which itself is controlled by a input voltage comparator 22. The input voltage comparator 22 has as its inputs the DC input voltage which is supplied to the positive input terminal 10 and to the negative input terminal 12. In FIG. 1, the input voltage comparator 22 obtains these inputs through a connection to the positive input terminal 10, and a connection to ground.

During a charge cycle, the first switch 14 and the second switch 18 are both maintained in the closed position by the input timing circuit 20, thereby connecting the inductor 16 across the DC input voltage. No connection of the inductor 16 to the output circuitry (which will be discussed below) is made during the charge cycle. The input voltage comparator 22 monitors the DC input voltage, and in all of the embodiments of the present invention categorizes the DC input voltage into a plurality of discrete voltage levels.

For example, if the DC input voltage may vary widely between 3.0 volts and 9.5 volts, and three discrete levels are to be used, the first level may be between 3.0 and 4.7 volts, the second level may be between 4.7 and 7.1 volts, and the third level may be between 7.1 and 9.5 volts. Which level the DC input voltage actually applied to the positive input terminal 10 and the negative input terminal 12 falls into will be determined by the input voltage comparator 22. A signal indicating which one of the discrete levels the DC input voltage falls into is sent from the input voltage comparator 22 to the input timing circuit 20.

The input timing circuit 20 calculates the maximum length of time that the discrete voltage level into which the DC input voltage falls may be connected to the inductor 16 without saturating the inductor 16. This maximum length of time begins at the moment the inductor 16 is first connected to the DC input voltage by the first switch 14 and the second switch 18 being closed by the input timing circuit 20. When this maximum length of time elapses, the first switch 14 and the second switch 18 are opened by the input timing circuit 20, thereby disconnecting the inductor 16 from the DC input voltage.

A different maximum length of time is calculated for each of the discrete voltage levels. Typically, the maximum length of time for a particular voltage level is the amount of time the maximum voltage in that voltage level could be connected to the inductor 16 without saturating it. By charging the inductor 16 to a point just short of saturation, the optimum power capability is achieved. It will at once be realized by those skilled in the art that power capability can be increased marginally by having more discrete voltage levels. The price for this gain in power capability is of course increased circuit complexity. For the example discussed herein, it is believed that three discrete voltage levels do an adequate job in maintaining a fairly high level of efficiency in the charging operation.

The output side of the circuit of FIG. 1 may now be discussed. A third switch 24 is connected on one side to the other side of the inductor 16; the other side of the third switch 24 is connected to a positive output terminal 26. The other output terminal is a negative output terminal 28, which, like the negative input terminal 12, is grounded. One side of a fourth switch 30 is connected to the one side of the inductor 16; the other side of the fourth switch 30 is grounded.

The third switch 24 and the fourth switch 30 are also preferably either mechanically or electrically required to operate together, so that when the third switch 24 is closed the fourth switch 30 is also closed, and so that when the third switch 24 is open the fourth switch 30 is also open. The third switch 24 and the fourth switch 30 are operated by an output timing circuit 32, which itself is controlled by an output voltage comparator 34. The output voltage comparator 34 has as its inputs the DC output voltage at which the load connected across the positive output terminal 26 and the negative output terminal 28 is operating. The output voltage comparator 34 obtains these inputs through a connection to the positive output terminal 26, and a connection to ground.

During a discharge cycle, the third switch 24 and the fourth switch 30 are both maintained in the closed position by the output timing circuit 32, thereby connecting the inductor 16 across the DC output voltage. No connection of the inductor 16 to the input circuitry discussed below is made during the discharge cycle, and the first switch 14 and the second switch 18 are maintained in an open position during the discharge cycle. The output voltage comparator 34 monitors the DC output voltage, and in the first embodiment of the present invention categorizes the DC output voltage into a plurality of discrete voltage levels.

For example, if the DC output voltage may vary widely between 5.0 volts and 15.0 volts, and three discrete levels are to be used, the first level may be between 5.0 and 7.5 volts, the second level may be between 7.5 and 10.5 volts, and the third level may be between 10.5 and 15.0 volts. Which level the DC output voltage actually applied to the positive output terminal 26 and the negative output terminal 28 falls into will be determined by the output voltage comparator 34. A signal indicating which one of the discrete levels the DC output voltage falls into is sent from the output voltage comparator 34 to the output timing circuit 32.

The output timing circuit 32 calculates the minimum length of time that the discrete voltage level into which the DC output voltage falls must be connected to the inductor 16 to just fully discharge the inductor 16. This minimum length of time begins at the moment the inductor 16 is first connected to the DC output voltage by the third switch 24 and the fourth switch 30 being closed by the output timing circuit 32. When this minimum length of time elapses, the third switch 24 and the fourth switch 30 are opened by the output timing circuit 32, thereby disconnecting the inductor 16 from the DC output voltage.

A different minimum length of time is calculated for each of the discrete voltage levels. Typically, the minimum length of time for a particular voltage level is the amount of time the inductor 16 requires to discharge into the output of the system when the DC output voltage is equal to the minimum voltage in that particular voltage level. By discharging the inductor 16 completely, the optimum power capability is achieved since boosting of charge during the next charging cycle, which could lead to saturation of the inductor 16, is avoided. It will be realized by those skilled in the art that power capability may again be increased marginally by having more discrete voltage levels, but at a price of increased circuit complexity. It is believed that three discrete voltage levels do an adequate job in maintaining a fairly high level of power capability in the discharging operation for the example given herein.

It has been pointed out above that during the charging operation, the inductor 16 is disconnected from the output side of the circuitry, and that during the discharging operation the inductor 16 is disconnected from the input side of the circuitry. In the first embodiment of the present invention, this is accomplished by having the input timing circuit 20 and the output timing circuit 32 exert an interlocking influence on each other. Specifically, immediately subsequent to the execution of a charging operation, the input timing circuit 20 first causes the first switch 14 and the second switch 18 to be opened, and then sends a discharge enable signal required for the output timing circuit 32 to operate. From this point on the input timing circuit 20 is disabled from closing the first switch 14 and the second switch 18, until it is enabled by the output timing circuit 32.

The output timing circuit 32, having received the discharge enable signal from the input timing circuit 20, which indicates that the input circuitry is disconnected from the inductor 16, then initiates the discharge cycle by closing the third switch 24 and the fourth switch 30 for the minimum period of time indicated by the discrete voltage level supplied from the output voltage comparator 34 as an input to the output timing circuit 32. Following this minimum period of time elapsing, the third switch 24 and the fourth switch 30 are opened, and then the output timing circuit 32 sends a charge enable signal required for the input timing circuit 20 to operate. From this point on the output timing circuit 32 is disabled from closing the third switch 24 and the fourth switch 30, until it is once again enabled by the input timing circuit 20.

The input timing circuit 20, having received the charge enable signal from the output timing circuit 32, which indicates that the output circuitry is disconnected from the inductor 16, then initiates the charge cycle by closing the first switch 14 and the second switch 18 for the maximum period of time indicated by the discrete voltage level supplied from the input voltage comparator 22 as an input to the input timing circuit 20. Following this maximum period of time elapsing, the first switch 14 and the second switch 18 are opened, and then the input timing circuit 20 sends the discharge enable signal required for the output timing circuit 32 to operate, as mentioned above. It may thus be appreciated that the input circuitry and the output circuitry may not both be connected to the inductor 16 at the same time.

Completing the circuitry of FIG. 1 in the first embodiment is a capacitor 36 connected across the positive input terminal 10 and the negative input terminal 12, and a capacitor 38 connected across the positive output terminal 26 and the negative output terminal 28. The capacitors 36 and 38 are used to enhance high frequency response by keeping voltage rises as short as possible by sinking short transient currents. The capacitor 36 and 38 should be low ESR (equivalent series resistance) capacitors, typically 1000 microfarad electrolytic capacitors having an ESR of 0.05 ohms or less. It may also be noted that in all of the embodiments herein, all of the switches such as 14, 18, 24, and 30 are preferably transistor switches, such as JFETs.

Figure 2:
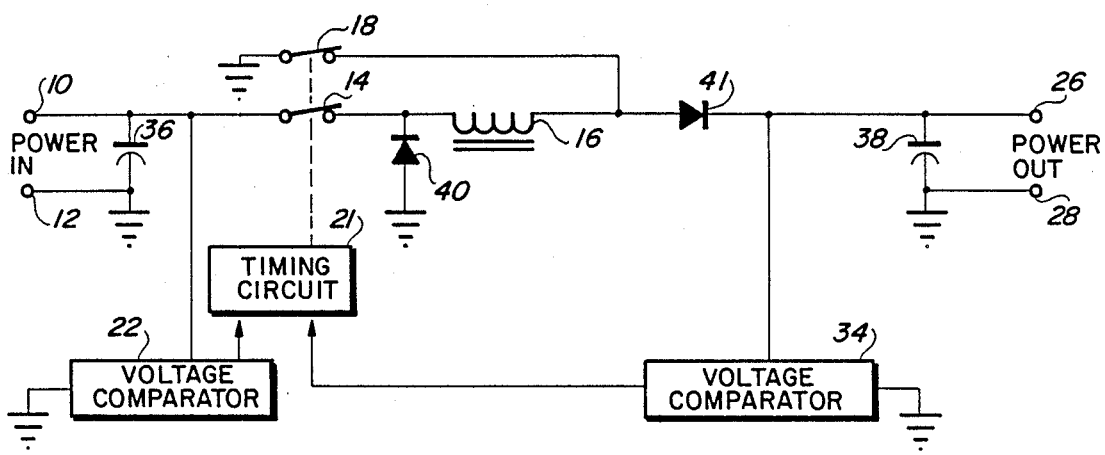
FIG. 2 is a somewhat functional schematic diagram of the preferred embodiment of the present invenion, with a simpler control system that the implementation illustrated in FIG. 1.

The preferred embodiment of the present invention is illustrated in FIG. 2, with the circuit being nearly identical on the input side to the circuit of FIG. 1. The output circuit is different, with the third switch 24 and the fourth switch 30 not being used; as a result, the output timing circuit 32 is no longer necessary. A diode 40 is installed between the one side of the inductor 16 and ground to allow current to flow from ground through the diode 40 to the one side of the inductor 16, and then through the inductor 16 from the other end. An additional change in the design is the addition of a second diode 41 between the other side of the inductor 16 and the positive output terminal 26, which diode 41 allows current to flow from the other end of the inductor through the diode 41 to the positive output terminal 26. It will be apparent to those skilled in the art that the diode 41 in the circuit of FIG. 2 operates like the third switch 24 in the circuit of FIG. 1. Similarly, the diode 40 in the circuit of FIG. 2 operates like the fourth switch 30 in the circuit of FIG. 1. The diodes 40 and 41 operate like automatic switches, and will be forward biased whenever current is flowing through the inductor 16 from the one end to the other end, and the first switch 14 and the second switch 18 are open.

The input voltage comparator 22 and the output voltage comparator 34 operate exactly the same as they do in the circuit of FIG. 1. The output timing circuit 32 is missing from the circuit of FIG. 2, since the diodes 40 and 41 turn themselves on at the proper times. Also a timing circuit 21 replaces the input timing circuit 20 of FIG. 1, with the timing circuit having as inputs the indications of voltage level from both the input voltage comparator 22 and the output voltage comparator 34.

The operation of the circuit of FIG. 2 is different, particularly in how the inputs from the input voltage comparator 22 and the output voltage comparator 34 are used. The input from the input voltage comparator 22 indicating which level the DC input voltage actually applied to the positive input terminal 10 and the negative input terminal 12 falls into will be used by the timing circuit 21 to determine the length of time to charge the inductor 16. The timing circuit 21 actuates the first switch 14 and the second switch 18 in the circuit of FIG. 2 instead of the input timing circuit 20 of FIG. 1. Accordingly, the input from the input voltage comparator 22 determines how long the first switch 14 and the second switch 18 will remain closed to fully charge the inductor 16 without saturating it.

Similarly, the input from the outlet voltage comparator 34 indicating which level the DC output voltage actually applied to the positive outlet terminal 26 and the negative outlet terminal 28 falls into will be used by the timing circuit 21 to determine the length of time to discharge the inductor 16. Since no switches need be closed on the outlet side of the circuit of FIG. 2, the input from the outlet voltage comparator 34 determines how long the first switch 14 and the second switch 18 will remain open to completely discharge the inductor 16 without waiting an unduly long time.

It will be understood by those skilled in the art that the circuit of FIG. 2 is the preferred embodiment of the present invention, since it operates just as effectively as the circuit of FIG. 1, yet requires fewer components to operate. The capacitors 36 and 38 are also used in the circuit of FIG. 2, for the same reasons as they are used in FIG. 1.

Figure 3:
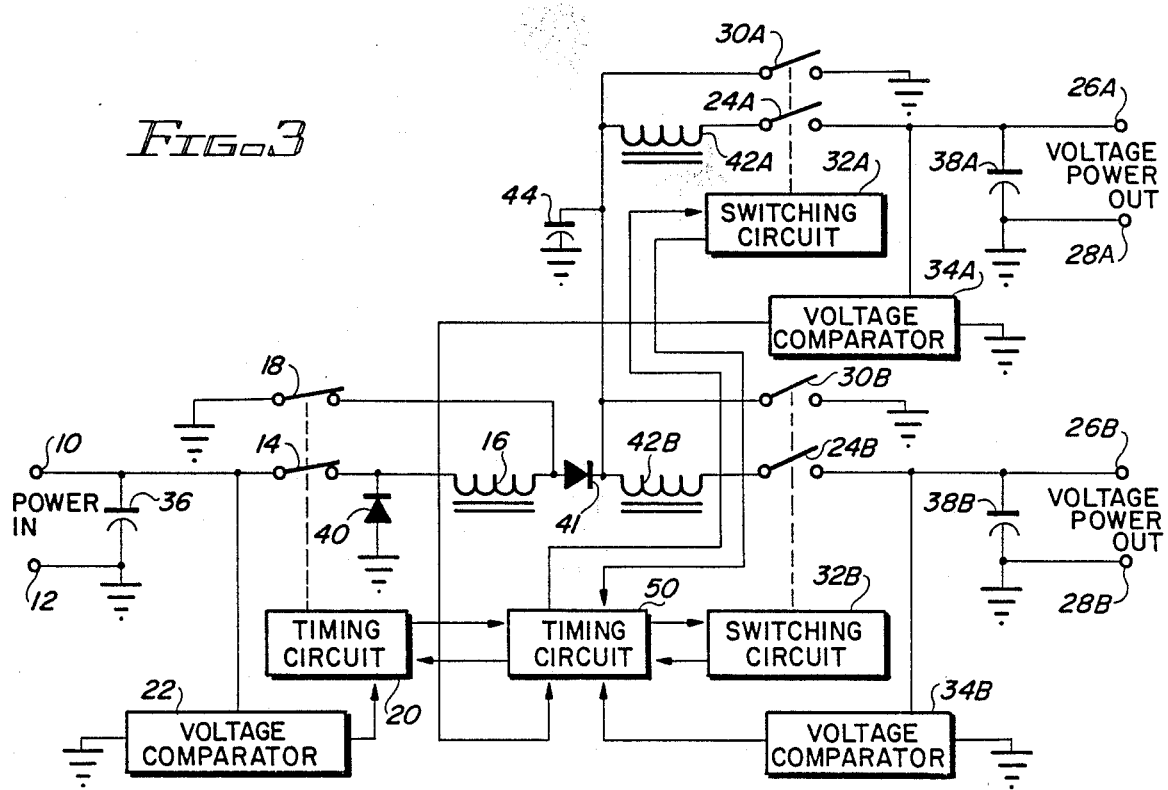
FIG. 3 is a somewhat functional schematic diagram of an alternate embodiment of the present invention in which two different DC output voltages may be supplied by the system.

If the circuits of FIGS. 1 or 2 are used as a power supply, it is evident that they can supply only one output voltage at a time. The multiple output voltage embodiment of the present invention shown in FIG. 3 is configured to supply two different DC output voltages, a high DC output voltage and a low DC output voltage. The input side of the circuit of FIG. 3 is identical to that of FIG. 2, and it operates in basically the same way. The output circuitry on the other side of the inductor 16, however, is different from the circuit of FIGS. 1 and 2.

There are two parallel output circuits driven by the other side of the inductor 16, and the construction of these two output circuits is essentially identical. Accordingly, all reference numerals used to describe them will be the same, with an "A" suffix being added to the reference numerals on the high voltage output circuit, and a "B" suffix being added to the reference numerals on the low voltage circuit. The following description mentions specifically the construction of the high voltage system; however, it will be understood that the description is equally applicable to the construction of the low voltage system.

The inductor 16 is used to drive the output circuits through a diode 41, which allows current to pass from the other side of the inductor 16 to one side of an output inductor 42A. The one side of the output inductor 42A is also connected to one side of a capacitor 44, the other side of which capacitor 44 is grounded. The capacitor 44 is also used in the preferred embodiment to enhance high frequency response, and is preferably a low ESR electrolytic capacitor of approximately 1000 microfarads.

The other side of the output inductor 42A is connected to one side of a third switch 24A, the other side of which third switch is connected to a positive output terminal 26A. The output across the positive output terminal 26A and the negative output terminal 28A is the high DC output voltage. Also connected across the positive output terminal 26A and the negative output terminal 28A is a capacitor 38A used to enhance high frequency response.

A fourth switch 30A is connected on one side to the one side of the output inductor 42A, and on the other side to ground. The third switch 24A and the fourth switch 30A are again preferably either mechanically or electrically required to operate together, so that when the third switch 24A is closed the fourth switch 30A is also closed, and so that when the third switch 24A is open the fourth switch 30A is also open. The third switch 24A and the fourth switch 30A are operated by an output timing circuit 32A, which itself is controlled by an output voltage comparator 34A. The output voltage comparator 34A has as its inputs the DC output voltage at wich the load connected across the positive output terminal 26A and the negative output terminal 28A is operating. The output voltage comparator 34A obtains these inputs through a connection to the positive output terminal 26A, and a connection to ground.

During a discharge cycle, the third switch 24A and the fourth switch 30A are both maintained in the closed position by the output timing circuit 32A, thereby connecting the output inductor 42A across the high DC output voltage. The output voltage comparator 34A monitors the high DC output voltage, and in the preferred embodiment of the present invention categorizes the high DC output voltage into a plurality of discrete voltage levels. Which level the high DC output voltage actually applied to the positive output terminal 26A and the negative output terminal 28A falls into will be determined by the output voltage comparator 34A. A signal indicating which one of the discrete levels the DC output voltage falls into is sent from the output voltage comparator 34A to the output timing circuit 32A.

A main output timing circuit 50, in conjunction with the output timing circuit 32A and the output timing circuit 32B, calculates the minimum length of time required by the two output circuits operating simultaneously to just fully discharge the inductor 16. This minimum length of time begins at the moment the output inductor 42A is first connected to the high DC output voltage by the third switch 24A and the fourth switch 30A being closed by the output timing circuit 32A and the output inductor 42B is first connected to the high DC output voltage by the third switch 24B and the fourth switch 30B being closed by the output timing circuit 32B. When this minimum length of time elapses, the third switch 24A and the fourth switch 30A are opened by the output timing circuit 32B and the third switch 24B and the fourth switch 30B are opened by the output timing circuit 32B, thereby disconnecting the output inductor 42A from the high DC output voltage and disconnecting the output inductor 42B from the low DC output voltage.

By discharging current in the inductor 16 completely through the diode 40 and the output inductors 42A and 42B, optimum power capability is achieved since boosting of charge during the next charging cycle, which could lead to saturation of the inductor 16, is avoided. Again, power capability may again be increased marginally by having more discrete output voltage levels, but at a price of increased circuit complexity. It is believed that three discrete voltage levels do an adequate job in maintaining a fairly high level of power capability in the discharging operation.

It may therefore be appreciated that the present invention teaches a DC to DC inductive power converter which is capable of efficiently operating over a relatively wide range of DC input voltages. The inductive power converter of the present invention is capable of efficiently supplying an output voltage which may vary widely. The present invention in an alternate embodiment is also capable of simultaneously and efficiently supplying power at two or more voltage levels.

The system maximizes the efficiency of the power conversion process. It enables charging of the inductor to a point near, but short of, saturation at any or all of the DC input voltages at which the device may be operated. It also enables discharging of the inductor completely, without wasting any additional time and adversely affecting power capability. By simultaneously maximizing power capability on both the input side of the inductor and on the output side of the inductor, overall power capability of the device is maximized.

By achieving these objectives, the system of the present invention is able to convert a variable DC input voltage into a variable DC output voltage, while maximizing overall power capability of the system without undue complexity. In the alternate embodiment two or more different DC output voltages may be provided without sacrificing any of the advantages realized by the invention. Finally, all of the aforesaid advantages and objectives are achieved without incurring any substantial relative disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An inductive power converter for converting a variable DC input voltage to a variable DC output voltage, comprising:
   an inductor;
   first connecting means for selectively connecting said DC input voltage to said inductor to charge said inductor;
   first monitoring means for monitoring said DC input voltage and providing a first signal indicative of the magnitude of said DC input voltage, said first signal indicating into which of at least three discrete input voltage levels said DC input voltage falls;

second connecting means for selectively connecting said DC output voltage to said inductor to discharge said inductor;

second monitoring means for monitoring said DC output voltage and providing a second signal indicative of the magnitude of said DC output voltage, said second signal indicating into which of at least three discrete output voltage levels said DC output voltage falls; and timing means for controlling the operation of said first and second connecting means to alternately cause said first connecting means to charge said inductor up nearly to the saturation point in response to said first signal indicative of the magnitude of said DC input voltage, and said second connecting means to discharge said inductor just completely in response to said second signal indicative of the magnitude of said DC output voltage.

2. An inductive power converter as defined in claim 1 wherein the negative side of said DC input voltage is grounded, said first connecting means comprising:

a first switch connecting on one side thereof to the positive side of said DC input voltage and on the other side thereof to one side of said inductor; and a second switch connected on one side thereof to the other side of said inductor and on the other side thereof to the ground.

3. An inductive power converter as defined in claim 2, wherein said first and second switches are transistors.

4. An inductive power converter as defined in claim 3, wherein said first and second switches are JFET transistors.

5. An inductive power converter as defined in claim 2, wherein said first and second switches are interconnected to operate simultaneously.

6. An inductive power converter as defined in claim 1, wherein the negative side of said DC input voltage is grounded, said second connecting means comprising:

a first diode connected on one side thereof to ground and on the other side thereof to one side of said inductor, said diode for allowing current to flow from ground to said inductor; and a second diode connected on one side thereof to the other side of said inductor and on the other side thereof to the positive side of said DC output voltage.

7. An inductive power converter as defined in claim 6, wherein said first and second diodes conduct only when said inductor is charged and said first connecting means are not connecting said inductor to said DC input voltage.

8. An inductive power converter as defined in claim 1, wherein the negative side of said DC input voltage is grounded, said second connecting means comprising:

a third switch connected on one side thereof to the other side of said inductor and on the other side thereof to the positive side of said DC output voltage; and a fourth switch connected on one side thereof to one side of said inductor and on the other side thereof to ground.

9. An inductive power converter as defined in claim 1, additionally comprising:

means for inhibiting the simultaneous occurrence of said first connecting means connecting said inductor to said DC input voltage and said second connecting means connecting said inductor to said DC output voltage.

10. An inductive power converter as defined in claim 1, wherein each of said discrete input voltage levels has a maximum input voltage in that discrete input voltage level, the maximum input voltage level at any particular time being the maximum input voltage in the particular input voltage level into which said DC input voltage falls into at the time of initiating the charging of said inductor, wherein the time said inductor is charged is the maximum time said maximum input voltage level may be applied to said inductor without saturating it; wherein each of said discrete output voltage levels has a minimum output voltage in that discrete output voltage level, the minimum output voltage level at any particular time being the minimum output voltage in the particular output voltage level into which said DC output voltage falls into at the time of initiating the discharging of said inductor, wherein the time said inductor is discharged is the minimum time said minimum voltage level requires to completely discharge said inductor.

11. An inductive power converter as defined in claim 1, wherein said first monitoring means comprises a first voltage comparator providing said first signal indicative of which of said input voltage levels said DC input voltage falls into at the time of initiating the charging of said inductor, and said second monitoring means comprises a second voltage comparator providing said second signal indicative of which of said output voltage levels said DC output voltage falls into at the time of initiating the discharging of said inductor.

12. An inductive power converter as defined in claim 11, wherein the time said inductor is charged is determined by the maximum voltage in the range making up the particular input voltage level said DC input voltage falls into at the time of initiating the charging of said inductor, and the time said inductor is discharged is determined by the minimum voltage in the range making up the particular output voltage level said DC output voltage falls into at the time of initiating the discharging of said inductor.

13. An inductive power converter as defined in claim 12, wherein the time said inductor is charged is the maximum time said maximum voltage may be applied to said inductor without saturating it, and the time said inductor is discharged is the minimum time said minimum voltage takes to completely discharge said inductor.

14. An inductive power converter for converting a variable DC input voltage to a variable DC output voltage, comprising:

an inductor;

first connecting means for selecting connecting said DC input voltage to said inductor to charge said inductor;

first monitoring means for monitoring said DC input voltage and providing a signal indicative of the magnitude of said DC input voltage;

second connecting means for selectively connecting said DC output voltage to said inductor to discharge said inductor;

second monitoring means for monitoring said DC output voltage and providing a signal indicative of the magnitude of said DC output voltage; and timing means for controlling the operation of said first and second connecting means to alternately cause said first connecting means to charge said inductor up nearly to the saturation point in response to said signal indicative of the magnitude of said DC input voltage, and said second connecting means to discharge said inductor just completely in response to said signal indicative of the magnitude of said DC output voltage.

15. An inductive power converter as defined in claim 14, wherein said first monitoring means comprises a first voltage comparator providing a signal indicative of which of a plurality of levels said DC input voltage falls into at the time of initiating the charging of said inductor, and said second monitoring means comprises a second voltage comparator providing a signal indicative of which of a plurality of levels said DC output voltage falls into at the time of initiating the discharging of said inductor.

16. An inductive power converter as defined in claim 15, wherein the time said inductor is charged is determined by the maximum voltage in the range making up the particular level said DC input voltge falls into at the time of initiating the charging of said inductor, and the time said inductor is discharged is determined by the minimum voltage in the range making up the particular level said DC output voltage falls into at the time of initiating the discharging of said inductor.

17. An inductive power converter as defined in claim 16, wherein the time said inductor is charged is the maximum time said maximum voltage may be applied to said inductor without saturating it, and the time said inductor is discharged is the minimum time said minimum voltage takes to completely discharge said inductor.

18. An inductive power converter for converting a variable DC input voltage to a variable DC output voltage, wherein the negative sides of said DC input and output voltages are grounded, said inductive power converter comprising:
an inductor;
a first switch connected on one side thereof to the positive side of said DC input voltage and on the other side thereof to one side of said inductor;
a second switch connected on one side thereof to the other side of said inductor and on the other side thereof to the ground;
a first diode connected on one side thereof to ground and on the other side thereof to said one side of said inductor, said diode for allowing current to flow from ground to said inductor;
a second diode connected on one side thereof to said other side of said inductor and on the other side thereof to the positive side of said DC output voltage;
first monitoring means for monitoring said DC input voltage and providing a signal indicative of which of a plurality of levels said DC input voltage falls into at the time of initiating the charging of said inductor;
second monitoring means for monitoring said DC output voltage and providing a signal indicative of which of a plurality of levels said DC output voltage falls into at the time of initiating the discharging of said inductor; and
timing means for controlling the alternate simultaneous opening and closing of said first and second switches, said first and second switches both being closed by said timing means to charge said inductor and held closed by said timing means in response to said signal indicative of which level said DC input voltage falls into until said inductor is charged up nearly to the saturation point, said first and second switches then being opened by said timing means and held open by said timing means in response to said signal indicative of which level said DC output voltage falls into until said first and second diodes discharge said inductor completely.

19. A method of converting a variable DC input voltage to a variable DC output voltage using an inductor, comprising:
first selectively connecting said DC input voltage to said inductor to charge said inductor;
first monitoring said DC input voltage and providing a signal indicative of the magnitude of said DC input voltage;
second selectively connecting said DC output voltage to said inductor to discharge said inductor;
second monitoring said DC output voltage and providing a signal indicative of the magnitude of said DC output voltage; and
controlling the operation of said first and second connecting steps to alternately cause said first connecting step to charge said inductor up nearly to the saturation point in response to said signal indicative of the magnitude of said DC input voltage, and said second connecting step to discharge said inductor just completely in response to said signal indicative of the magnitude of said DC output voltage.

20. An inductive power converter for converting a variable DC input voltage to a variable DC output voltage, comprising:
an inductor;
first connecting means for selectively connecting said DC input voltage to said inductor to charge said inductor;
first monitoring means for monitoring said DC input voltage and providing a first signal indicative of which of a plurality of discrete input voltage levels said DC input voltage falls into, wherein each of said discrete input voltage levels has a maximum input voltage in that discrete input voltage level, the maximum input voltage level at any particular time being the maximum input voltage in the particular input voltage level into which said DC input voltage falls into at the time of initiating the charging of said inductor;
second connecting means for selectively connecting said DC output voltage to said inductor to discharge said inductor;
second monitoring means for monitoring said DC output voltage and providing a second signal indicative of which of a purality of discrete output voltage levels said DC output voltage falls into, wherein each of said discrete output voltage levels has a minimum output voltage in that discrete output voltage level, the minimum output voltage level at any particular time being the minimum output voltage in the particular output voltage level into which said DC output voltage falls into at the time of initiating the discharging of said inductor; and
timing means for controlling the operation of said first and second connecting means to alternately cause said first connecting means to charge said inductor for the maximum time said maximum input voltage level may be applied to said inductor without saturating it, and said second connecting means to discharge said inductor for the minimum time said minimum voltage level requires to completely discharge said inductor.

21. A method of converting a variable DC input voltage to a variable DC output voltage using an inductor, comprising:
   first selectively connecting said DC input voltage to said inductor to charge said inductor;
   first monitoring said DC input voltage and providing a first signal indicative of the magnitude of said DC input voltage, said first signal indicating into which of at least three discrete input voltage levels said DC input voltage falls;
   second selectively connecting said DC output voltage to said inductor to discharge said inductor;
   second monitoring said DC output voltage and providing a second signal indicative of the magnitude of said DC output voltage, said second signal indicating into which of at least three discrete output voltage levels said DC output voltage falls; and
   controlling the operation of said first and second connecting steps to alternately cause said first connecting step to charge said inductor up nearly to the saturation point in response to said first signal indicative of the magnitude of said DC input voltage, and said second connecting step to discharge said inductor just completely in response to said second signal indicative of the magnitude of said DC output voltage.

* * * * *